United States Patent
Sundqvist et al.

(10) Patent No.: US 6,868,751 B2
(45) Date of Patent: Mar. 22, 2005

(54) PARKING BRAKE

(75) Inventors: Fredrik Sundqvist, Umeå (SE); Pär Marklund, Göteborg (SE)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/816,867

(22) Filed: Mar. 23, 2001

(65) Prior Publication Data

US 2002/0003068 A1 Jan. 10, 2002

Related U.S. Application Data (63) Continuation of application No. PCT/SE99/01656, filed on Sep. 22, 1999.

(30) Foreign Application Priority Data

Sep. 24, 1998 (SE) .............................................. 9803255

(51) Int. Cl.[7] .............................. F16C 1/16; F16C 1/22
(52) U.S. Cl. ................................ 74/500.5; 74/501.6 R; 74/538; 74/560
(58) Field of Search ....................... 74/512, 560, 500.5, 74/501.5 R, 501.6, 502.2, 502, 533, 536, 588

(56) References Cited

U.S. PATENT DOCUMENTS

| | | | | | |
|---|---|---|---|---|---|
| 3,602,064 | A | * | 8/1971 | Francis | 74/512 |
| 3,691,868 | A | * | 9/1972 | Smith | 74/512 |
| 4,793,206 | A | * | 12/1988 | Suzuki | 74/501.5 R |
| 4,854,187 | A | * | 8/1989 | Walters | 74/535 |
| 4,958,536 | A | * | 9/1990 | Baumgarten | 74/501.5 R |
| 5,528,957 | A | * | 6/1996 | Belmond et al. | 74/538 |
| 6,244,129 | B1 | * | 6/2001 | Krug et al. | 74/501.5 R |

FOREIGN PATENT DOCUMENTS

| | | |
|---|---|---|
| DE | 2553228 A1 | 6/1977 |
| DE | 3900174 A1 | 7/1990 |
| FR | 393808 A | 11/1948 |

* cited by examiner

*Primary Examiner*—Chong H. Kim
(74) *Attorney, Agent, or Firm*—Fitch, Even, Tabin & Flannery (57) ABSTRACT

A parking brake including a lever (3) coupled to a brake wire (9) included in the brake system. The lever (3) is arranged to work in two steps to achieve the desired braking power. In the first step the lever is arranged to make a translational movement for taking up wire slack in the brake system, while in the second step the lever is arranged to execute a rotation whereby the force transmission to the wire (9) takes place at a higher ratio than in the first step.

8 Claims, 11 Drawing Sheets

PARKING BRAKE

CROSS REFERENCE TO RELATED APPLICATIONS

This is a continuation patent application of International Application No. PCT/SE99/01656 filed Sep. 22, 1999 which designates the United States; the disclosure of that application is expressly incorporated by reference in its entirety.

FIELD OF THE INVENTION

The present invention relates to an arrangement for use in connection with a parking brake for a vehicle; more pecifically, the arrangement includes a lever coupled to at least one force transmitting wire in the brake system.

BACKGROUND OF INVENTION

Conventional parking brakes of the above intimated type require relatively long levers to achieve the necessary torque to sufficiently tension the wire. This is because conventionally designed systems do not have the possibility to optimally take up slack in the wire which is always present to a greater or lesser degree in such wire systems. The slack in the wire must be taken up before it is possible to utilize a greater force ratio. On taking up wire in conventional systems, the wire is wound onto a quadrant, whereby the attachment point follows the rotation of the lever and the wire is wound onto the quadrant. The shape of the quadrant contributes to a great extent to the force ratio in the system. It is quite possible to shape it such that an optimal force ratio from a force point of view can be used, but this would imply that the system would be very sensitive to slack in the wire and yielding in the system. The problem with today's systems is that, to ensure that the system does not stop working when the degree of slack increases, a more advantageous force ratio for the wire path must be used, which implies that the required application force will be high. This, in turn, contributes to the size of the lever.

For conventional parking brake systems, it is therefore sometimes necessary to adjust the slack in the wire. The presence of wire slack which has to be taken up by the rotation of the lever thus means that a certain adjusted angular position of the lever does not always correspond to the same wire force. Because relatively large levers are required for conventional parking brake systems, the brake lever dominates the driver's area. The required size also means that it is difficult to place the lever in an ergonomically advantageous position in the car.

SUMMARY OF INVENTION

An object of the present invention is to provide a parking brake in which the above mentioned problems are eliminated.

This is achieved according to the invention by arranging the lever of the parking brake to be pulled up in two steps for achieving the desired braking power. In the first step, the lever is made to perform a translational motion to take up the wire slack in the brake system. In the second step the lever is made to perform a rotational motion whereby transmission of the force to the wire is achieved with a higher force ratio than in the first step.

This way of designing the parking brake has among others, the following advantages. Lowering the required overall pulling force on the lever compared to previously known brake systems. The lever can be made smaller. The lever is not so dominant in the driver's area. The lever is more easily placed in a good position in the car compared to previously known larger levers. The slack is taken up by a translational motion, thus diminishing the need of later adjustment. The arrangement is less sensitive to wear.

According to one embodiment, the invention is characterized by the fact that day force sensing mechanism is coupled to the wire. Still further, the mechanism includes a pawl arranged to retract from its locking position to allow rotation only after the slack in the wire has been taken up and the force in the wire exceeds a chosen or predetermined value.

The advantage of this characteristic is that the force sensor makes it possible to control the force at which the transition between rotation and translation takes place and that the necessary pulling force on the lever during the rotational motion is always the same at the same angular position of the lever. That is, a given position of the lever always gives the same brake power because all slack has been taken up by the translational motion.

BRIEF DESCRIPTION OF DRAWINGS

The invention will be described in the following in greater detail with reference to the attached drawings of which.

DETAILED DESCRIPTION

Figure 1:
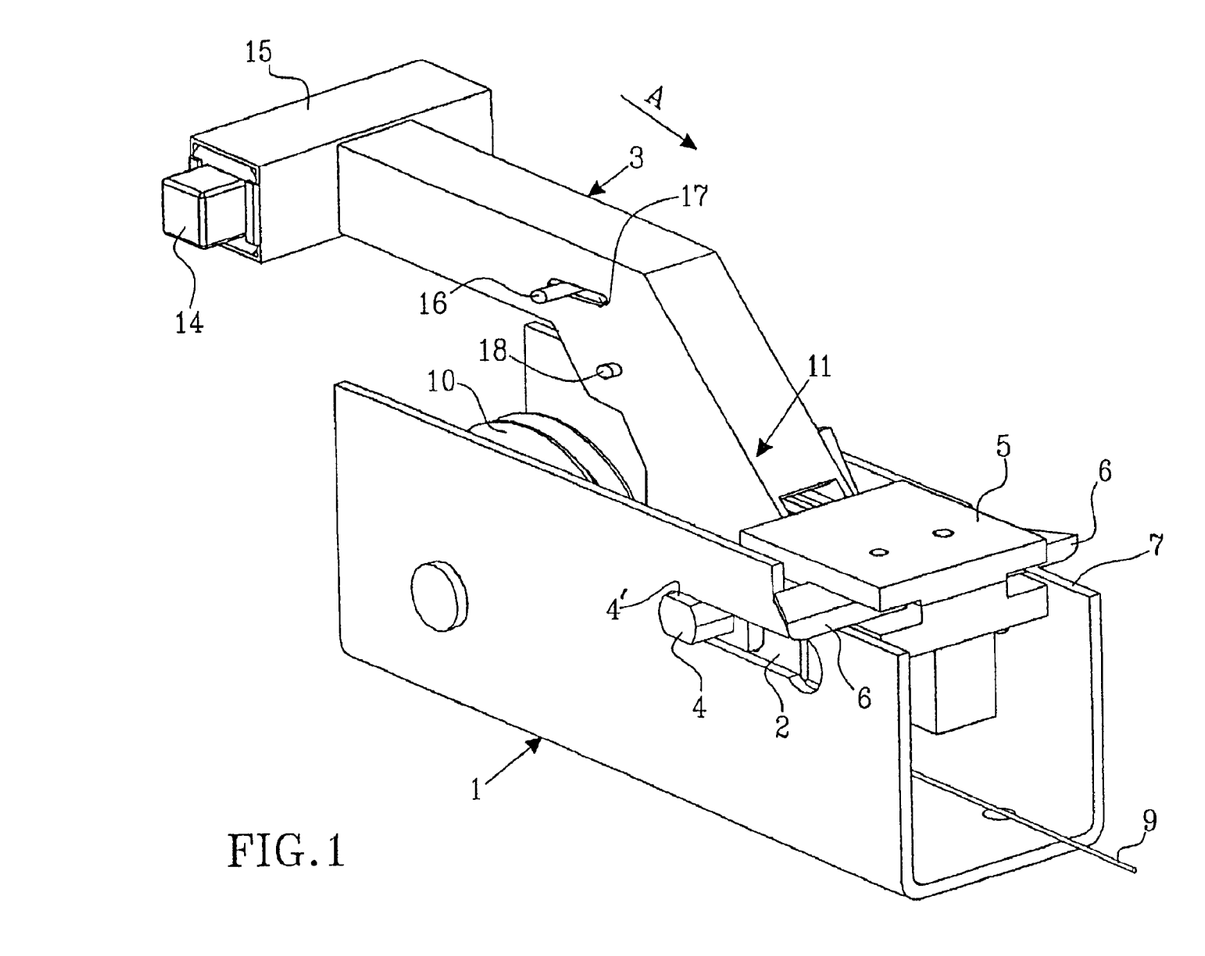
FIG. 1 is a perspective view of a first embodiment of a parking brake constructed according to the invention.

In FIG. 1, a housing is denoted by reference numeral 1. It is intended to be embedded in the middle or center console of a passenger car or like vehicle.

The two opposing sides of the housing holder have guide slots 2 in which the rotation axle 4 of the lever is placed. A housing 5 with arms 6 is attached to the same axle 4. They lie on the blocking surfaces 7 of the housing holder in the unloaded position of the parking brake shown in FIG. 1. The rotation axle 4 of the lever 3 is beveled on its two ends and rotationally inserted into the guide slots 2 in the two sides of the housing holder 1. A wire 9 is attached to a brake unit which is intended to affect the back wheels of the vehicle as illustrated. The wire 9 passes over a pulley 10 before being attached to the housing 5.

Figure 2:
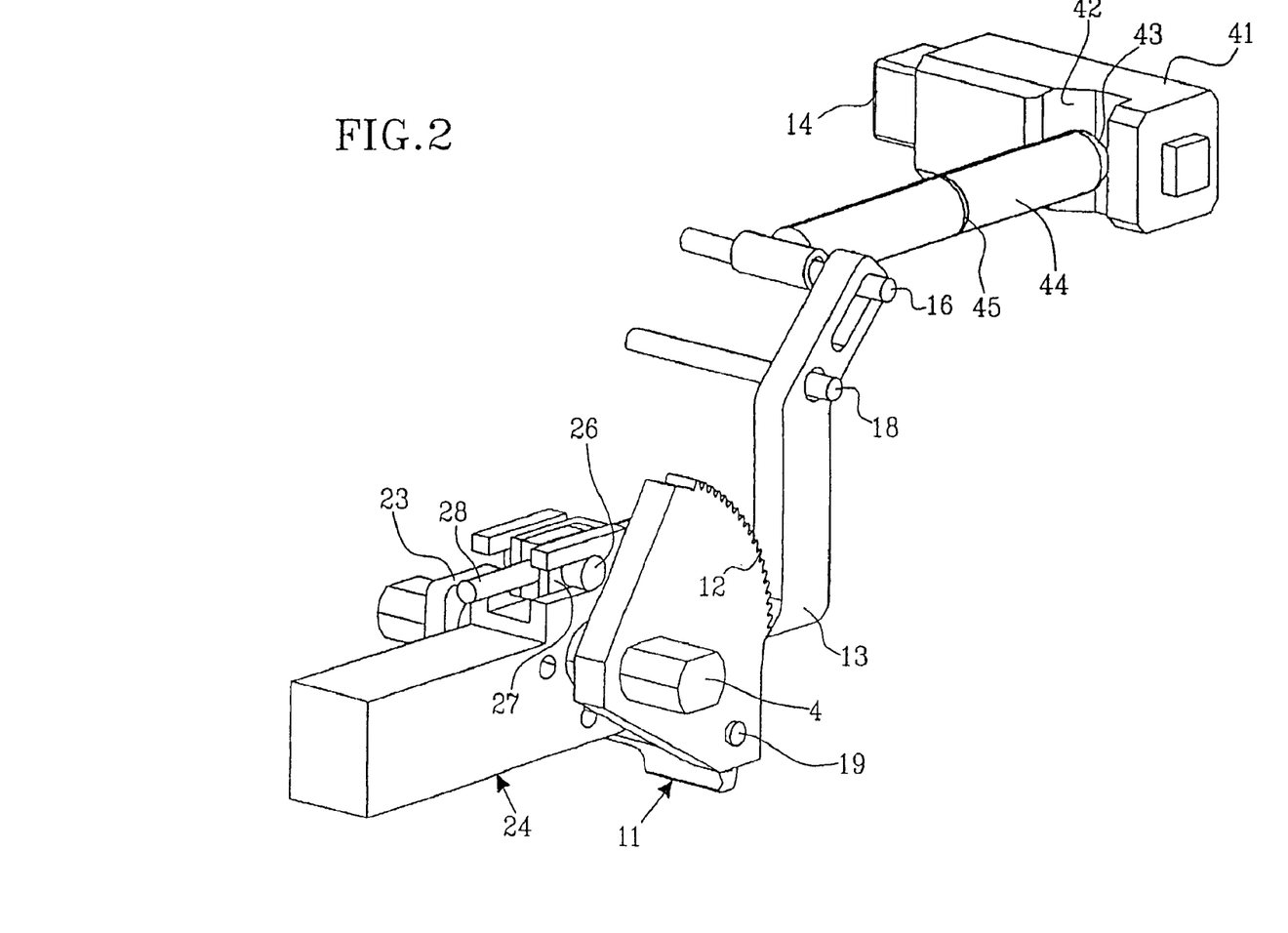
FIGS. 2–6 are perspective views showing in greater detail a number of parts of the parking brake included in the embodiment of FIG. 1.

In FIG. 2 the housing holder 1, the lever 3 and a portion of the housing have been removed for better understanding of the interiorly located components. A translation lock 11 is included in the parking brake. The lock 11 is intended to cooperate with a gear typically located in the bottom of the housing holder 1. Further, there is a ratchet 12 in the form of a geared arc cooperating with a pawl 13. In the lever, there is a link mechanism that locks the translation and rotation locks when the parking brake is set. By pressing the release button 14 against a biasing spring housed within the handle 15, a link mechanism for releasing the rotation lock is activated. A guide axle 16 in the link system is mounted in a guide slot 17 in the lever 3 in which a rotation axle is also present. On pressing the release button 14, the pawl 13 is immediately withdrawn from the ratchet 12.

As is apparent from FIG. 2, the release button 14 is designed in a single piece with a push component 41 inside the handle working against the spring. The push component is equipped with a wedge shaped groove 42 that cooperates with a hemispherical end part 43 of a pressure bar 44 that is included in the link mechanism. The bar 44 has a ring-shaped groove 45 in which a ring is placed that functions as a spring stop. In the lever there is also a fixed spring stop at the opposite end of the pressure bar relative to the hemispherical end. Between the spring stops on the pressure bar is a pressure bar spring. On pressing the button and consequent displacement of the push component 41, the wedge shaped groove 42 cooperates with the spherical end of the pressure bar, whereby the pressure bar is pressed against the spring. The guide axle 16 is thus displaced in the groove 17 making the lever arm 13' swing around the rotation spindle 18 and withdraws the pawl from the ratchet 12.

As is clear from FIG. 2, the ratchet is irrotationally attached to one of the two beveled ends 4' of the rotation axle of the lever. Because both ends 4' of the rotation axle are mounted in the guide slot 8, the geared arc of the ratchet 12 cannot rotate.

Figure 3:
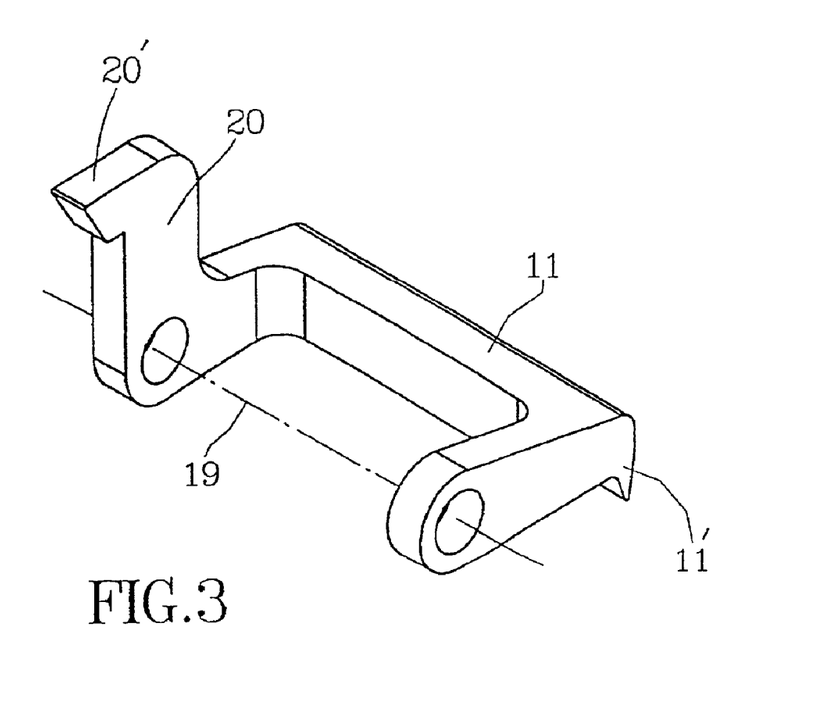

The translation lock, best illustrated in FIG. 3, is arranged to swing around a rotation axle 19 indicated by a dash-dotted line in FIG. 3. The translation lock 11 has a pawl 11' intended to cooperate with gear for locking the hand brake in the chosen translational position, and a lever arm 20, which when subject to a force, lifts the pawl 11' out of engagement with the gear tooth.

The pawl 11' and the teeth of the gear are shaped so that the translation lock's pawl can move along the gear when the handbrake is applied, while the teeth and the pawl cooperate to lock it in the opposite direction.

The rotation axle 19 of the translation lock is fastened by its ends in a part of the ratchet and in a holder 23 as shown in FIG. 2. As mentioned above, the pawl 13 is immediately released from the ratchet upon pressing of the button 14. To release the translation lock 11, the lever must, however, be in its lowered position somewhat below the position shown in FIG. 2. This makes dynamic braking possible without the risk that the translation lock might release. The lever arm of the translation lock cooperates with a release rod 22 fastened on the lever where the lower end of the rod reaches the flat surface 20' of the lever arm first when the lever is in the position shown in FIG. 2. On continued lowering of the lever, the release rod 22 brings the lever arm 20 with it, whereby the translation lock is swung out of the locked position in the gear rack.

Figure 4A:
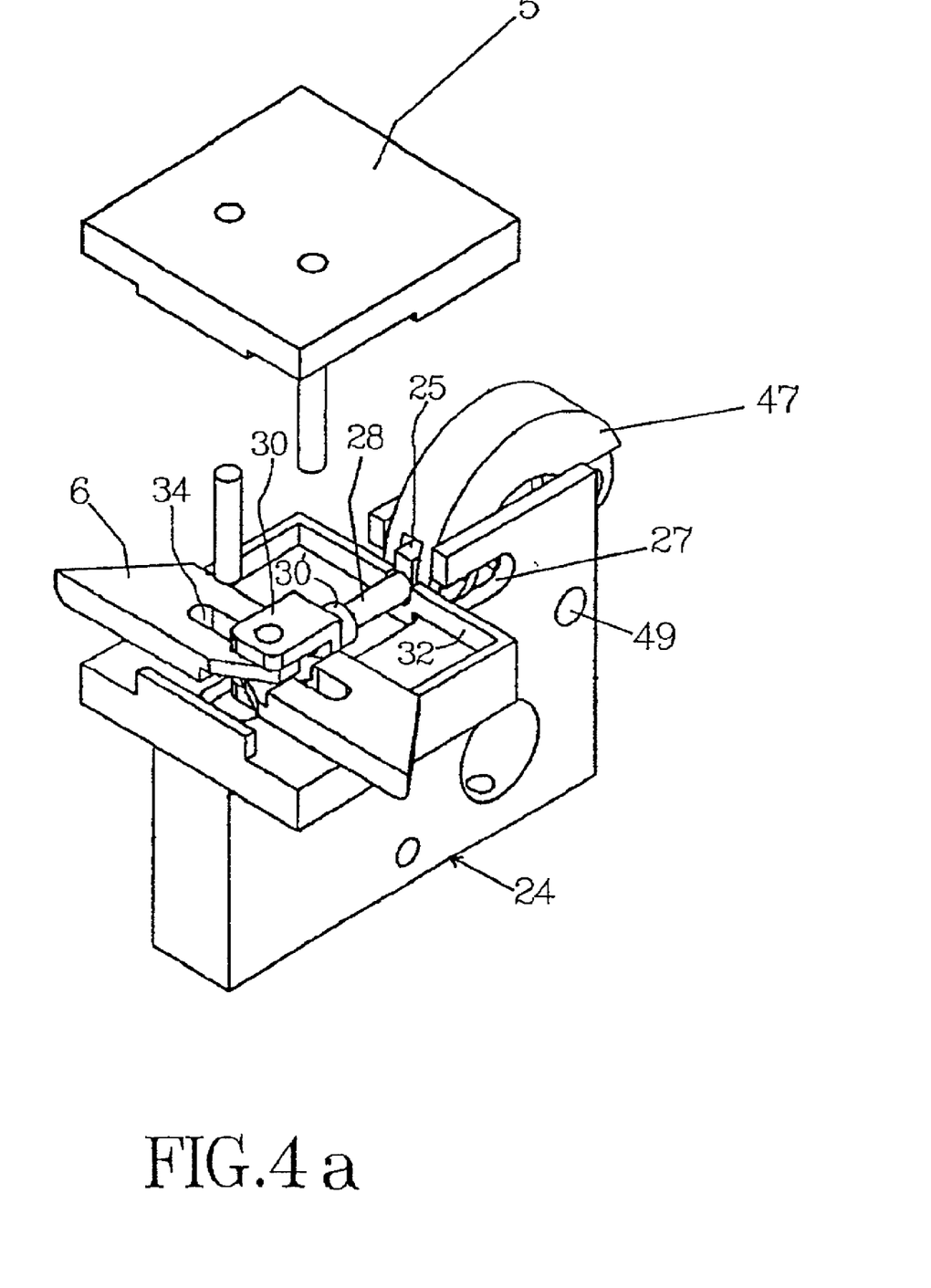
Figure 4B:
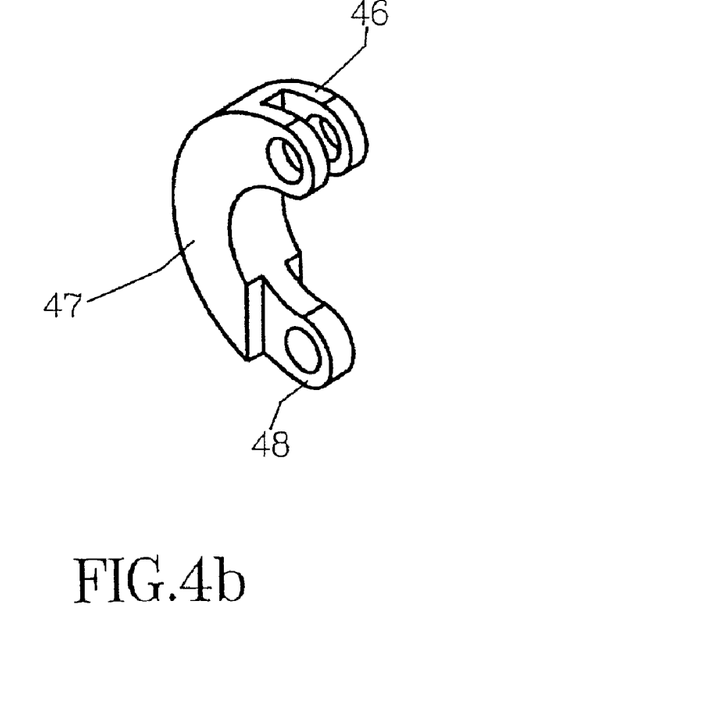
Figure 4C:
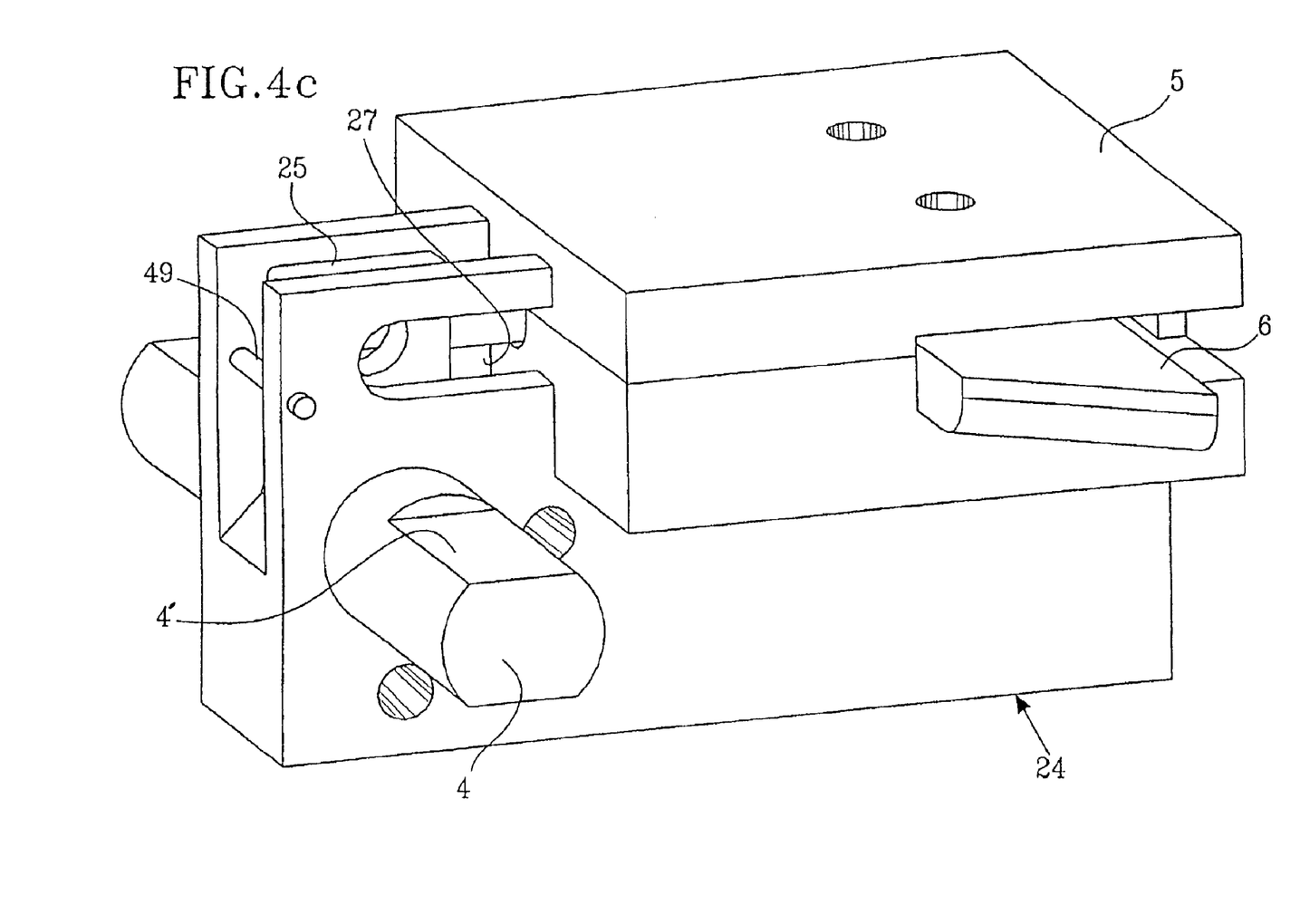
Figure 5:
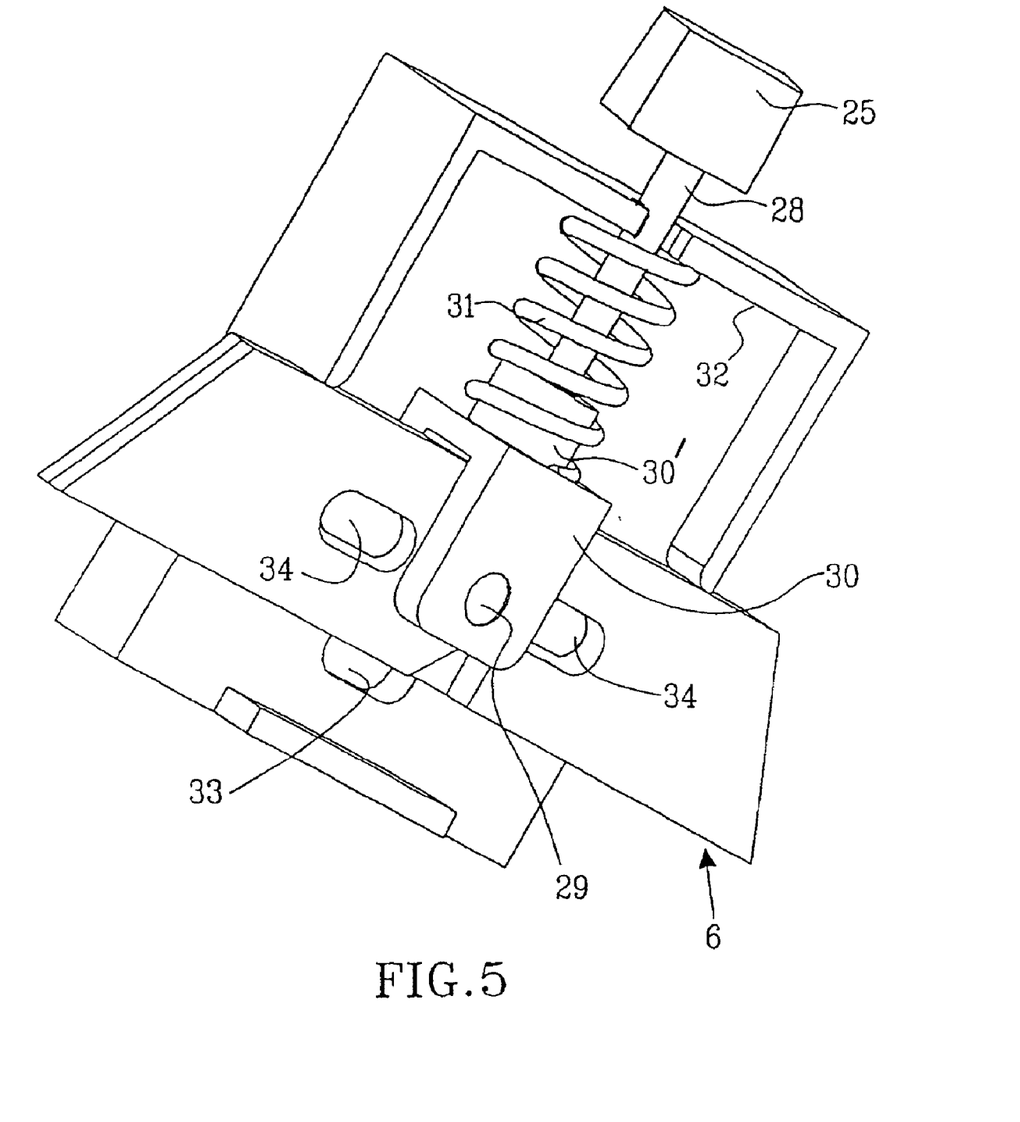

A housing beam 24 is rotationally mounted on the rotation axle 4 of the lever 3. A force transmitter 25 is mounted in a guide slot 27 on the housing beam using guide pin 26. Its shape, as well as the attachment of the housing 5 on the housing beam 24, is apparent from FIGS. 4a, 4b and 4c. The one end region 46 of a wire link 47, the shape of which is apparent from FIG. 4b, is attached via the guide pin 26 to the rectangular part of the force transmitter 25. The end of the wire link 47 is thus mounted in the guide slot 27 on the housing beam. The opposite end 48 of the wire link is attached to the brake wire 9. The rod shaped part 28 of the force transmitter 25 extends into the housing and is attached to the force sensing mechanism therein. The latter is placed in the housing 5 as shown in FIG. 5 with the top removed to show the force sensing mechanism. It includes two arms 6 rotationally mounted on an axle peg placed in the holes 29 in the walls of a fastener 30. The latter also has an external plug 30' with a threaded hole inside. In it there is a threaded end part of the force transmitter's rod shaped part 28 whereby the fastener 30 is attached to the force transmitter and, via the wire link 47, is also functionally connected to the brake wire 9.

On the axle plug 30' and the rod-shaped part 28, a spring 31 is mounted which is compressed between the fastener 30 and the wall 32 of the housing 5. A tension force in the brake wire will therefore compress the spring. The force sensor is guided by the slot 33 in the housing and by guide pins that extend through guide slots 34 in the respective arms 6 and which are mounted in the bottom and top of the housing. The spring 31 is dimensioned so that it is not totally compressed before slack in the brake wire is taken up and not before the force in the wire exceeds an appropriately chosen value of the order of 70 N. The arms 6 rest in the position shown in FIG. 5 on the guide surfaces 7 of the housing holder as shown in FIG. 1.

On compressing the spring 31, the arms 6 are moved and drawn in toward the center of the housing. This motion is controlled by the guide pins and the guide slots in which they cooperate. The arms and the spring are so designed that the arms completely glide off the side surfaces 7 of the housing holder when the spring is totally compressed. The arms are appropriately made of a plastic such as POM that gives low friction between the housing holder and the arms.

The guide pin 26 that holds the force transmitter 25 and the wire link 47 together moves in the glide slot 27 in the upper part of the housing holder beam 24. During the motion of the guide pin along the glide slot, the end region 46 of the wire link will thus be guided along that slot as the spring 31 in the force sensing mechanism is compressed. The distance between the glide slot 27 and the center of the rotation axle 4 of the lever 3 determines the force ratio on rotation of the lever for stretching the wire. A stop nipple 49 is arranged on the housing holder beam to cooperate with the wire link 47 to increase the force ratio when the lever is drawn through a large angle.

Figure 6:
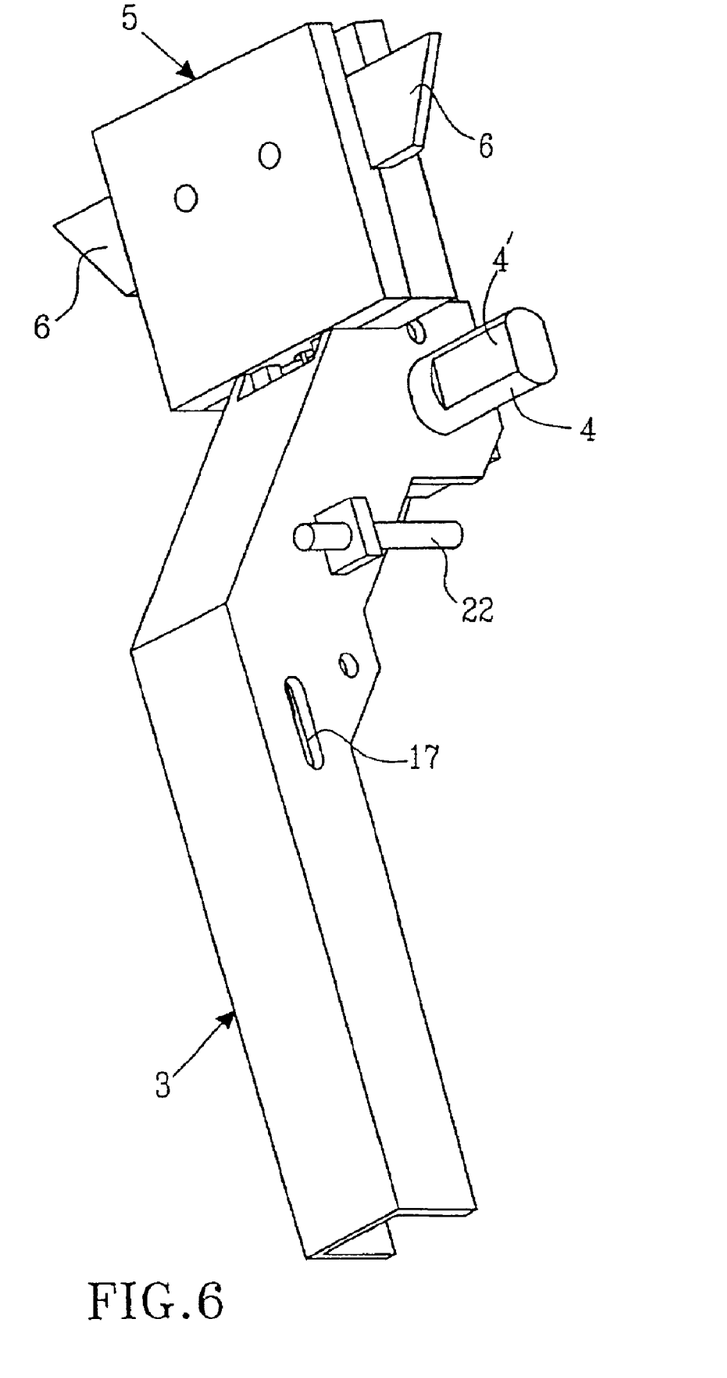

FIG. 6 shows the design of the lever 3 and its attachment to the rotation axle 4, as well as the lever's and housing's relative shapes that permit the units to cooperate during translational and rotational motion.

Functionally, the brake according to the invention is significantly different from conventional mechanical parking brake systems. On drawing up the parking brake, the driver grasps the handle 15 and pulls it toward himself. In conventional parking brakes the hand brake lever immediately begins to rotate to first take up existing slack in the wire system. Only thereafter is force applied on continued rotation.

When the hand brake shown in FIG. 1 is pulled, the lever does not rotate immediately, but instead moves in the direction of the arrow A. Rotation of the lever is prevented by the arms 6 of the housing 5 which are in engagement with the locking surfaces 7 of the housing holder 1. During translational motion, the brake lever's motion is guided by the guide slots 2 of the housing holder 1 in which the rotation axle of the lever moves. The housing 5 and the force sensing mechanism mounted in it are moved translationally by the lever along the housing holder. When slack in the wire system has been taken up and the force in the wire 9 has reached a value at which the spring in the force sensing mechanism begins to be compressed, the spring then begins to be pressed together and the whole force sensing mechanism is translated inside the housing at the same time as the housing is translated. As described above, the translation of the force sensing mechanism implies that the arms 6 are drawn in toward the center of the housing and out of engagement with the locking surfaces 7 of the housing holder 1. When the arms 6 are completely within the walls of the housing holder, the motion of the lever and the housing upon continued activation of the lever changes from a translational motion to a rotation around the axle 4 which has now been displaced a little in the guide slot 8. The translational motion is hardly noticeable for the driver as the lever is normally only moved about 15 mm. In the first brake stage, during the translational motion, the force ratio is low; in the example shown, 1:1. In the second brake stage, during rotation, the brake lever changes automatically to a significantly higher ratio.

For a parking brake according to the invention, the force ratio, after taking up the wire slack, is significantly higher than for known parking brakes. This means that the dimensions of the lever can be reduced significantly relative to known brakes. The lever is therefore easier to position and it is easier to achieve ergonomically good solutions.

The direction of the guide slot 8 on the housing holder 1 that guides the translational motion can be chosen to give the ergonomically best pulling direction for the driver.

To release the brake, the release button 14 is pressed, whereby the ratchet is immediately freed while the translation lock is in operation until the lever has reached or is near its resting position. This makes dynamic braking and adjustment of the braking power possible, which adjustment can be desirable in certain situations.

The embodiment shown in FIGS. 7–10 functions in all major aspects in the same way as the parking brake in the embodiment described above. The parts have been given the same reference numbers in FIGS. 8–10 as corresponding parts in the above-described embodiment. In the following, only parts that are different to those in the above-described embodiment are treated briefly.

Figure 7:
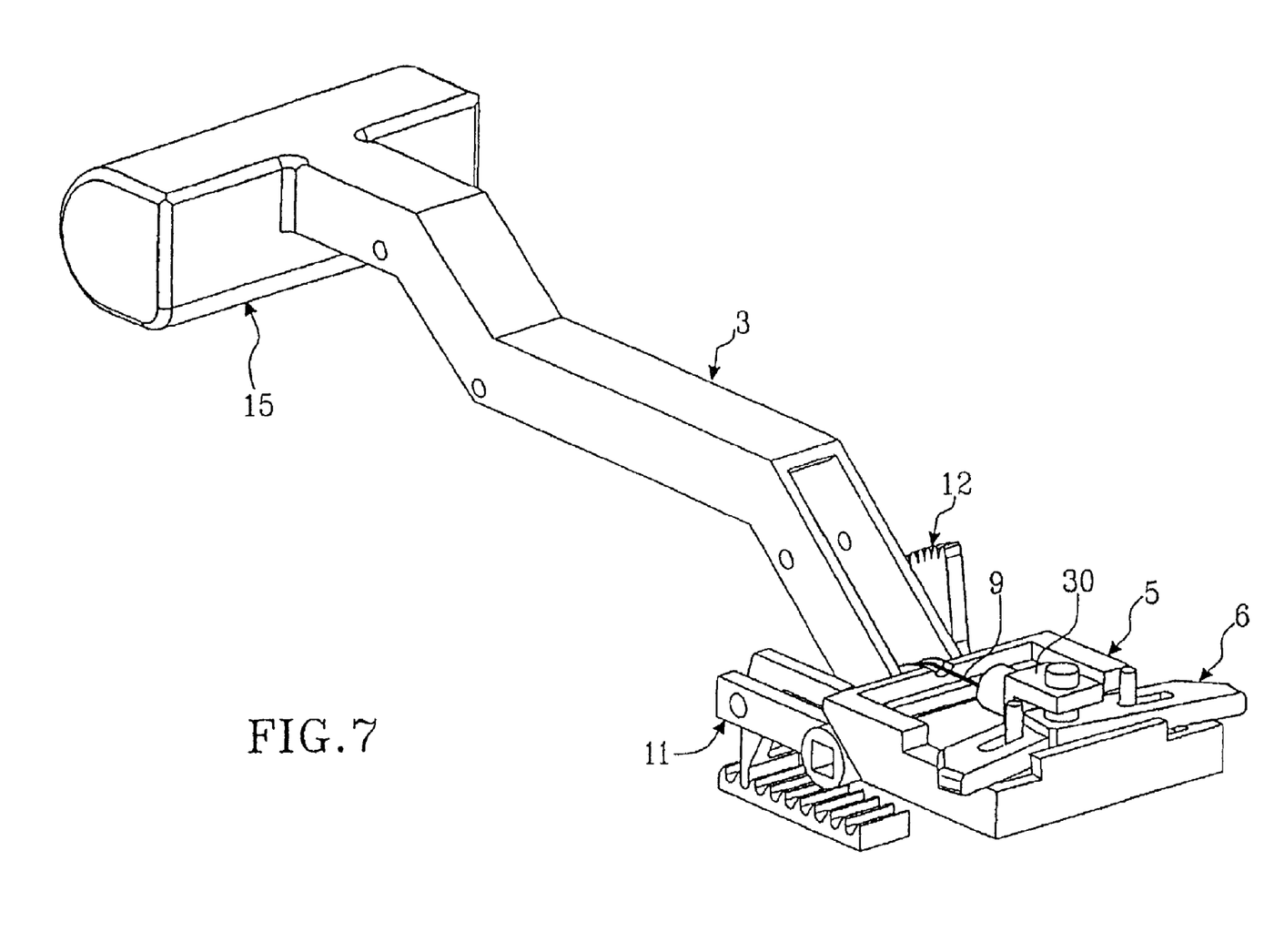
FIG. 7 is a perspective view showing details of another embodiment of a parking brake constructed according to the invention.

In FIG. 7, it is primarily only the housing 5 and its attachment that are different. In this embodiment, there is no housing holder beam. Instead, the housing 5 is connected to the rotation axle of the lever 3. The housing 5, best shown in FIG. 8, has a pulley 35 along which the wire 9 runs to the fastener 30. In the closed position adjacent to the lever, the housing is connected via splined couplings to the rotation axle of the lever which is located in the center hole of the pulley 35. The lever is also attached using splined couplings. The lever rests against the angled wall 36 of the housing 5 for better support.

Figure 8:
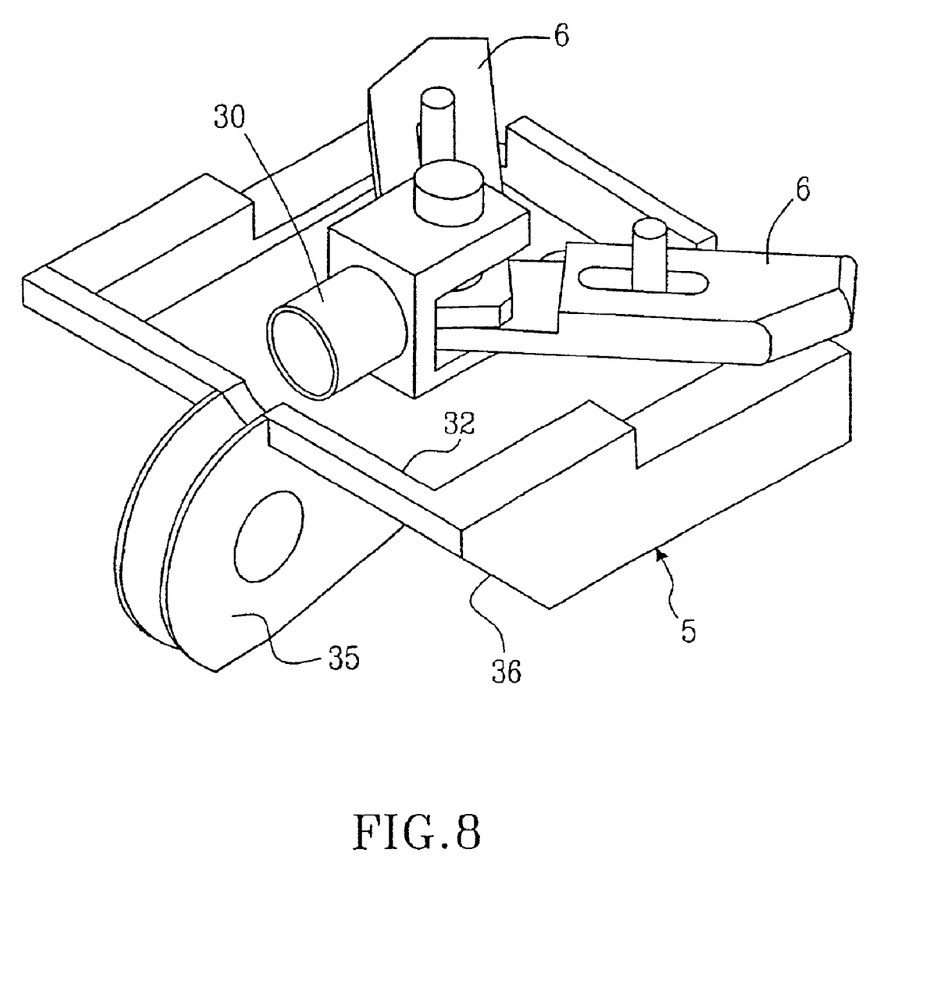
FIGS. 8–10 are perspective it views showing further details of the embodiment of the parking brake constructed according to FIG. 7.

The force ratio during the rotational motion is determined in this embodiment by the radius of the pulley and the length of the lever. Also in this embodiment there is a compression spring attached between the wall 32 and the fastener 30 in the force sensing mechanism. The housing 5 is also equipped as shown with a cover intended to be placed over the housing to contain the force sensing mechanism.

Figure 9:
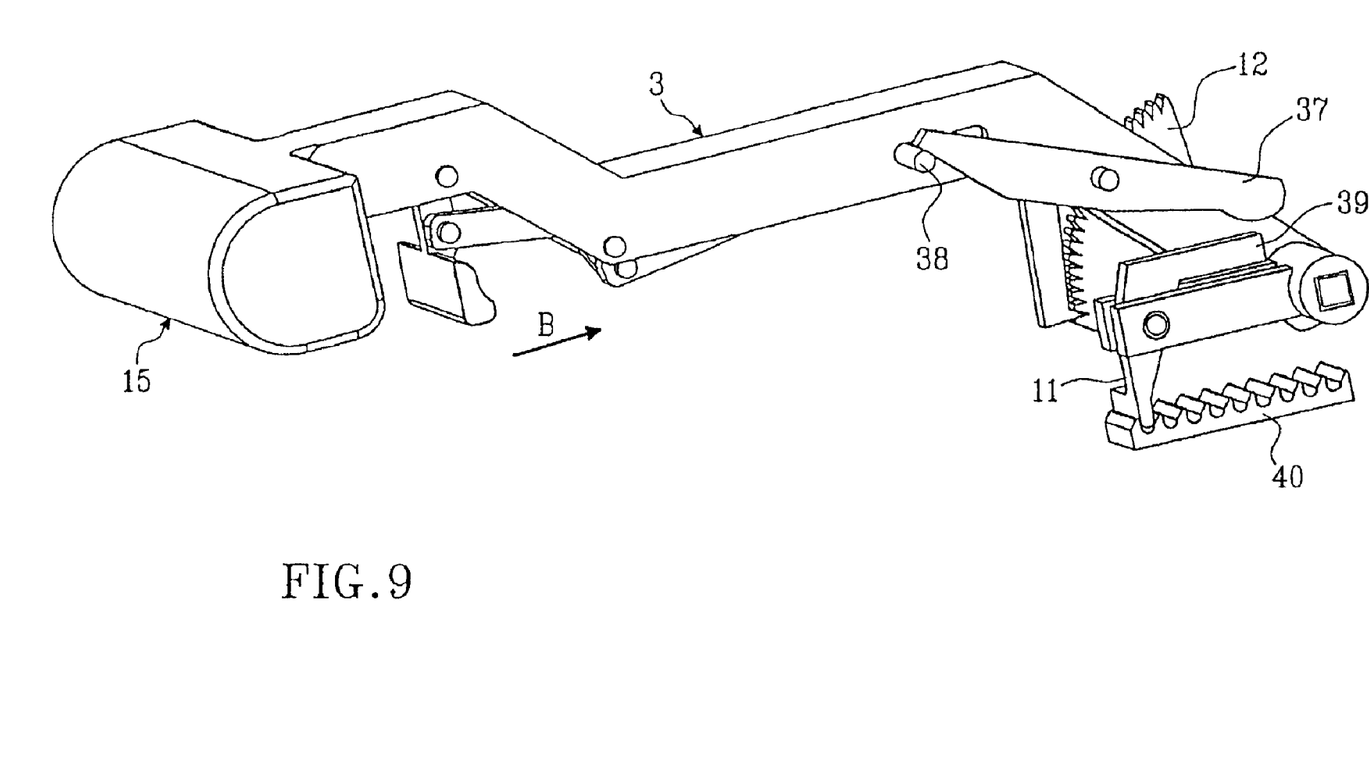

As is apparent from FIG. 9, the release button 14 is different and the associated link system is more simple in its construction. On releasing the parking brake, the button 14 is pushed in the direction of the arrow B whereby the ratchet 12 is immediately released. The translation lock can only be released when the lever is in or near its resting position. First, in that position, it is possible for the arm 37, which is moved clockwise by the plug 38 on pressing the release button 14, to reach the arm 39 of the translation lock 11 and press the translation lock out of engagement with the gear rack 40.

Figure 10:
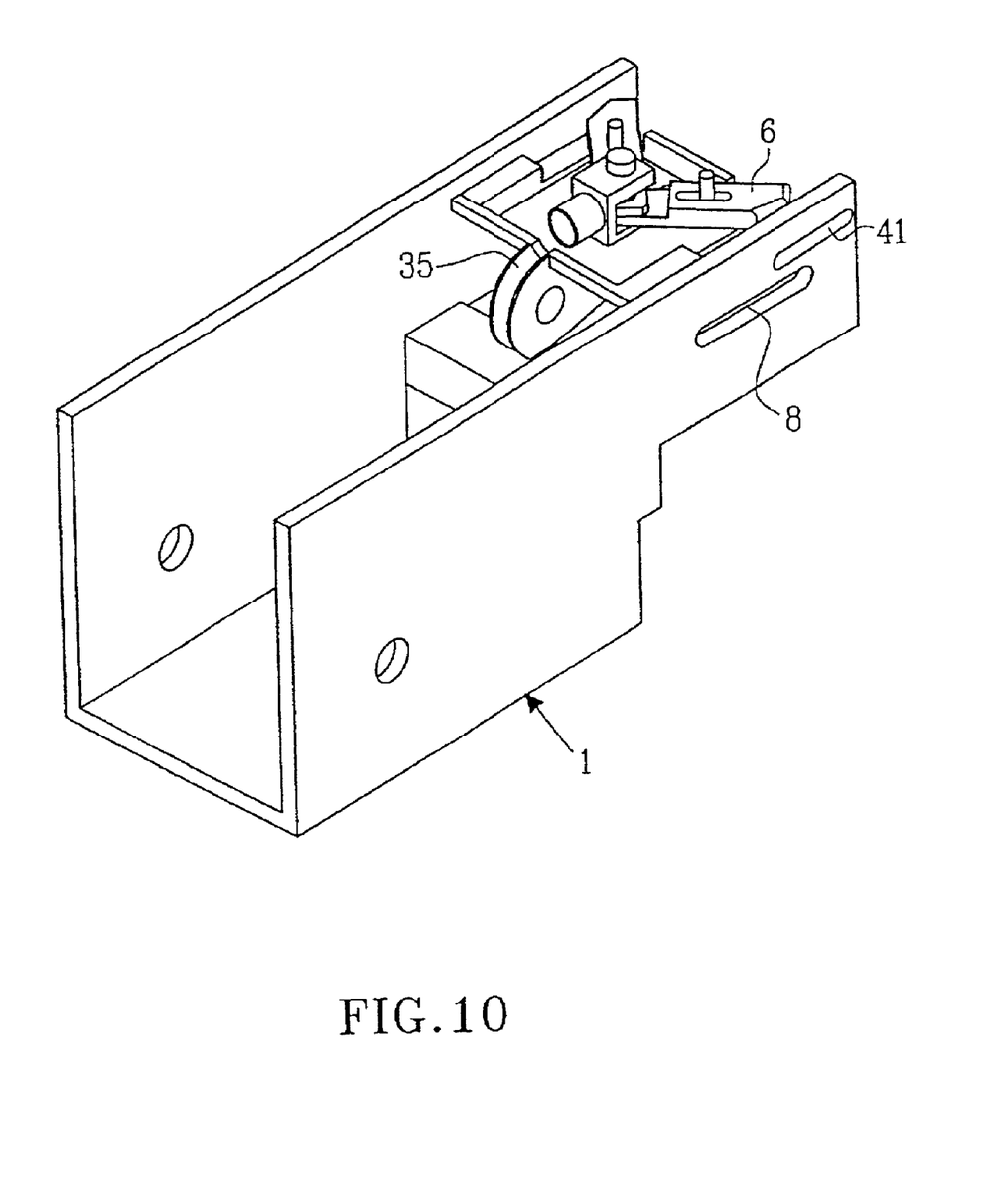

The housing holder 1 shown in FIG. 10 is somewhat modified compared to the first embodiment. The wire enters under the housing in the housing holder and is diverted by a pulley for fastening in the force sensing mechanism. In one end of the housing holder there is a guide slot 41 for the arms 6 of the force sensing mechanism.

The invention is not limited to the above-described embodiments. Rather many modifications are possible within the scope of the appended claims.

What is claimed and desired to be secured by Letters Patent is as follows:

1. An arrangement for use in connection with a parking brake for a vehicle, said arrangement comprising:
   a lever coupled to at least one force transmitting wire in a brake system, said lever being arranged so that application of the lever initials two steps to achieve the intended brake power; in a first step, the lever is arranged to make a translational movement for taking up wire slack in the brake system and in a second step, the lever is arranged to rotate, whereby force transmission to the wire takes place at a higher ratio than during said first step.

2. The arrangement according to claim 1, further comprising:
   a force sensing mechanism coupled to the wire, said force sensing mechanism having a locking pawl that is arranged to be released to allow rotation first when the slack in the wire is taken up, and when the force in the wire exceeds a chosen value.

3. The arrangement according to claim 2, further comprising:
   a translation lock arranged to retain the lever in the lever's tightened translational position;
   a ratchet arranged to retain the lever in its tightened rotational position;
   a release arrangement configured to release the translation lock and the ratchet, the release arrangement including a release button attached to the lever, the release button operating via a link system in the lever on the locks to free the translation lock and the ratchet; and
   the release apparatus being designed to first release the ratchet and thereafter, when the lever is in or near the lever's rest position, then release the translation lock.

4. The arrangement according to claim 1, further comprising:
   a housing in which the force sensing mechanism is positioned, the housing being placed in a housing holder fixed to the vehicle, the lever being rotatable on a rotation axle affixed in said housing holder, the housing and lever being positioned in direct contact with each other and arranged to cooperate so that only together can the housing and lever be moved or rotated in the housing holder, a locking apparatus included in the force sensing mechanism being equipped with arms that in the first brake step are arranged to prevent the housing from rotating in the housing holder, the force sensing mechanism including a spring so arranged that the spring is compressed by the force in the wire, the spring being dimensioned so that the spring is completely compressed first when the slack in the wire is taken up and the force in the wire exceeds said chosen value and the arms being arranged to be released from locking engagement with the housing holder when the spring is completely compressed.

5. The arrangement according to claim 4, wherein the housing is capable of translational motion relative to the housing holder and the translational motion is guided by at least one guide slot in the housing holder.

6. The arrangement according to claim 5, wherein said parking brake is placed in the middle console of the vehicle beside a gear lever in order to achieve an ergonomically good solution when using the hand brake, and the direction of said guide slots is chosen to achieve the ergonomically best possible pulling direction for the driver.

7. A parking brake for a vehicle comprising:

a housing holder configured with at least one guide slot, and a lever having a rotation axle, wherein the lever is slidably and rotationally coupled to the guide slot, and wherein the lever is coupled to at least one force transmitting wire in a brake system, said lever being arranged so that application of the lever initiates two steps to achieve a final intended brake power; in a first step, the lever and rotation axle are arranged to make a translational movement relative to the housing holder for taking up wire slack in the brake system, and in a second step, the lever is arranged to rotate about the rotation axle, whereby force transmission to the wire takes place at a higher ratio than during said first step so as to achieve the final intended brake power.

8. The parking brake of claim 7, where in the housing holder has two opposing side walls wherein each side wall has at least one guide slot and wherein the rotation axle of the lever is configured to translationally slide within the guide slot in the first step and wherein the lever is configured to rotate about the rotation axle relative to the guide slot in the second step.

* * * * *

UNITED STATES PATENT AND TRADEMARK OFFICE
CERTIFICATE OF CORRECTION

PATENT NO. : 6,868,751 B2
DATED : March 22, 2005
INVENTOR(S) : Sundqvist et al.

It is certified that error appears in the above-identified patent and that said Letters Patent is hereby corrected as shown below:

Column 6,
Line 14, delete "initials" and insert -- initiates --, therefor.
Line 33, delete "its" and insert -- the lever's --, therefor.
Line 45, delete "the" and insert -- a --, therefor.

Signed and Sealed this

Twelfth Day of July, 2005

JON W. DUDAS
*Director of the United States Patent and Trademark Office*